United States Patent [19]

Graae

[11] Patent Number: 4,671,755
[45] Date of Patent: Jun. 9, 1987

[54] SYSTEM FOR MOULDING SOLES ONTO SHOE LEGS

[76] Inventor: Jorgen Graae, Engen 21, DK-6270 Tønder, Denmark

[21] Appl. No.: 794,420

[22] Filed: Oct. 30, 1985

[30] Foreign Application Priority Data

Nov. 6, 1984 [DK] Denmark .................. 5274/84

[51] Int. Cl.$^4$ .................. A43D 65/00; B29C 45/06
[52] U.S. Cl. .................. 425/119; 425/126 R;
425/129 S; 425/183; 425/185; 425/186;
425/190; 425/308
[58] Field of Search .................. 425/129 S, 182, 183,
425/185, 186, 190, 193, 195, 161, 119, 117, 126
R, 289, 308; 264/244; 198/468.2

[56] References Cited

U.S. PATENT DOCUMENTS

| | | | |
|---|---|---|---|
| 3,467,985 | 9/1969 | Wessel | 425/129 S |
| 3,496,608 | 2/1970 | Eldred et al. | 425/129 S |
| 3,555,609 | 1/1971 | Chu et al. | 425/129 S |
| 3,915,608 | 10/1975 | Hujik | 425/129 S |
| 4,123,493 | 10/1978 | Schilke et al. | 425/129 S |
| 4,286,936 | 9/1981 | Hustedt | 425/129 S |
| 4,302,416 | 11/1981 | Rudolf et al. | 425/129 S |
| 4,465,448 | 8/1984 | Aldridge | 425/129 S |

FOREIGN PATENT DOCUMENTS

| | | |
|---|---|---|
| 1064387 | 8/1959 | Fed. Rep. of Germany . |
| 1529839 | 7/1966 | Fed. Rep. of Germany ... 425/129 S |
| 2903185 | 2/1979 | Fed. Rep. of Germany . |
| 1275095 | 5/1972 | United Kingdom . |

Primary Examiner—Willard E. Hoag
Attorney, Agent, or Firm—Mason, Fenwick & Lawrence

[57] ABSTRACT

Apparatus for controlling shoe production. A rotatable table has locations including last holders for receiving and holding a plurality of lasts. Each last holder extends upwardly away from its location. An endless conveyor, situated near the table, includes conveyor plates having last holders on which lasts can be mounted and dismounted. The conveyor plates and the locations occupy substantially the same horizontal plane. A robot, including a transferring device between the table and the conveyor, transfers lasts between the conveyor at a first transfer station and the table at second transfer station and visa versa. A shoe last rotating device rotates the lasts 180° to reorient each last from the position it occupies on the conveyor to the position it occupies on the last holder. A holding device causes each last holder to retain a last after the last is transferred to the table at the second transfer station and to release the last at the second transfer station after the table has revolved 360°. Each last, as oriented on the conveyor, includes a top portion and a bottom portion. The top portion has a gripping plate member with guides to be gripped and retained by the robot during last transfer from the conveyor to the table. Each conveyor plate includes a retainer for retaining one of the lasts in one of the plates by engaging the gripping plate member and the guide.

16 Claims, 12 Drawing Figures

SYSTEM FOR MOULDING SOLES ONTO SHOE LEGS

BACKGROUND OF THE INVENTION

The invention relates to a system for moulding soles onto shoe legs or uppers, said system comprising as well a rotatable moulding table with locations for a plurality of lasts as an endless conveyor situated next to the table and on which lasts can be mounted and dismounted.

DESCRIPTION OF THE PRIOR ART

The previous manufacture of shoes with a sole moulded of polyurethane foam involved the use of a circular rotatable moulding table comprising a plurality of last locations along its circumference. A mould is placed at each last location so as to allow moulding of a sole on the shoe leg placed on the last of said last location. At a first station on the moulding table the shoe legs are manually placed on the lasts as they pass said lasts. At a second station the moulding of the sole is carried out automatically, and at a third station relatively far from the second station the leg provided with sole is manually removed as the sole material then is suitably cured. The period passing from the moment a shoe sole is completely moulded until the next shoe sole is completely moulded is called the "measure time" (t). The period, i.e. the curing period, passing from the moment a shoe sole is carried from the second to the third station then corresponds to $T_o = t.n$ where n is the number of shoe soles, i.e. last locations, present between the second and the third station. When the capacity of the moulding table is to be increased the measure time (t) must be reduced, which, however, implies that $T_o$ is a constant, n, i.e. the number of last locations, must be increased, which in turn increases the angular curve between the second and the third station. Such an increase of the angular curve cannot be performed as a matter of course because the table then leaves no room for a suitable number of operators placing shoe legs on the lasts. It is a desire to allow an essential reduction of the "measure time" in spite of the above.

In connection with the manufacture of rubber footwear it has long been known to use two endless conveyors situated closely abutting over a short distance. The lasts are manually transferred from one conveyor to the other conveyor.

SUMMARY OF THE INVENTION

The object of the present invention is to provide a system of the above type which allows an essential reduction of the "measure time" of the moulding table, preferably by up to at least 33% and which furthermore is suited both for shoe lasts and boot lasts.

The system according to the invention is characterized in that at least one robot is present between a second transfer station on the moulding table and a first transfer station on the conveyor, said robot transferring lasts provided with shoe legs from the first transfer station to the second transfer station and later on from the latter back to the first transfer station, and that last holders are mounted above the individual last locations of the moulding table and as an integrating part of said moulding table, said last holders being adapted so that at the second transfer station they may receive and retain the individual lasts and later on—when the last holder returns to the second transfer station after having followed a 360° rotation of the moulding table—release the last, and that the conveyor is adapted to advance a plurality of conveyor plate members carrying the individual lasts and at the first transfer station adapted to release and receive, respectively, the lasts transferred by the robot, and that at the top each last comprises a gripping plate member to be gripped and retained in an exact manner by the robot and be fixed to the conveyor plate members and the last holders. As a result, a very considerable reduction of the "measure time" of the moulding table is allowed, e.g. by up to 33% corresponding to an increase of the capacity of the moulding table by 50%, as the second transfer station corresponding to the known third station can be situated in an angular position very far from the second station corresponding to the moulding station for instance 270° compared to the previous 180° without involving problems concerning the placing of the shoe legs on the lasts. The robot solves the lastmentioned problem of the second transfer station by removing completely the lasts provided with moulded soles and by subsequently placing new lasts with shoe legs ready for moulding on the moulding table. A robot takes up considerably less room than the operators used by the known machine and consequently the moulding table can be better utilized. After a last provided with a sole moulded onto the shoe leg has been transferred to the first transfer station on the conveyor by means of the robot where it is fixed in the conveyor plate members, said last slides forwards on the conveyor. The conveyor includes various stations subjecting the last to various posttreatments such as for instance a cooling and deburring of the shoe soles. At a replacing station the shoe legs provided with soles are manually removed from the lasts whereafter new shoe legs are placed, also manually, on said lasts. Subsequently the last slides forwards on the conveyor to the first transfer station where it is transferred by means of the robot to the last holder now positioned at the second transfer station. The last is retained by the last holder and advanced to the first station for a moulding thereon of the sole etc. The particular gripping plate member ensures that the last is gripped and retained very efficiently either by the robot or by the last holders or by the conveyor plate members. The system is suited both for shoe lasts and boot lasts.

According to the invention the part of the robot transferring the lasts from the first transfer station to the second transfer station or vice versa may be a moving arm provided with two pairs of gripping fingers handling maximum two lasts during a transferring movement of the moving arm. In this manner a very efficient utilization of the robot is obtained.

Moreover according to the invention the moulding table and the robot may each have a program control unit whereby the guiding of the conveyor may be an integrated part of a superior computer control. As a result, a particularly good coordination of the movements of the moulding table, the conveyor, and the robot is obtained.

Furthermore according to the invention the gripping fingers of each pair of gripping fingers on the moving arm of the robot may be mutually rotatable in a controlled manner, and each gripping finger may on the side opposing the second gripping finger be provided with at least two gripping projections co-operating with the gripping plate member of each last. In this manner the gripping fingers of the robot can grip very accurately about the gripping plate member.

Moreover according to the invention the last holder may be an adjusting member and optionally an intermediary member as well as movable holding jaws mounted on the bottom side of the adjusting member or the intermediary member, where the movability of the holding jaws has preferably been pneumatically provided by means of a magnetic valve, whereby a guiding pin furthermore may be provided on the bottom side of the adjusting member or the intermediary member, said guiding pin centering the last relative to the adjusting member or the intermediary member, respectively, whereas the gripping plate member on each side of two opposing side surfaces may comprise partly a groove receiving the two holding jaws, preferably ribs thereon, and partly at least two, preferably conical guiding holes automatically gripping the gripping plate member by means of the gripping projections of the gripping fingers of the robot. In this manner it is ensured that the gripping fingers of the robot can deliver very accurately the last on the second transfer station because the gripping plate member of the last is centered relative to the adjusting member or the intermediary member. The holding jaws fix the last efficiently.

According to the invention each conveyor plate member may comprise a substantially U-shaped bottom part and guide rails situated on the free webs of the U, said guide rails being mutually spaced a distance slightly greater than the thickness of the gripping plate member of each last and to form a slot, whereby a free guiding groove may be present between each guide rail and the bottom part therebelow, said guiding groove receiving the individual free locking webs of a substantially U-shaped locking means, whereby the latter can be adapted so as to be reciprocated parallel to the bottom part in such a manner that the locking webs can engage the grooves on each side of the gripping plate member and lock the latter onto the conveyor plate member when the gripping plate member of each last has been inserted in the slot between the two guide rails by means of the gripping fingers of the robot. In this manner a very exact fixing of each last onto each conveyor plate member is allowed, which is very decisive for the security in connection with the automatic handling.

Moreover according to the invention the first transfer station may comprise two neighboring operation zones which can be served simultaneously as conveyor plate members are provided in both zones and as the robot is adapted to remove a last from the conveyor plate member of one zone and optionally to let the conveyor plate member of the second zone remain idle intermediarily. The latter procedure turned out to be very advantageous.

Furthermore according to the invention the moving arm of the robot may at its outer end comprise a transverse part rotatable about the longitudinal axis of the moving arm in order to allow the moving arm at the first transfer station to handle the lasts with the soles facing upwards and during the transferring movement to turn said lasts and at the second transfer station to handle the lasts with the soles facing downwards. In this manner the efficiency of the robot is considerably increased.

According to the invention moving means may be present on the first transfer station, said moving means preferably being hydraulicly or pneumatically operated for the moving forwards and backwards of the U-shaped locking means. In this manner it is ensured that the U-shaped locking means can carry out very efficiently the locking of the gripping plate member of a last onto a conveyor plate member. When the locking means has been removed from the guide rails, the gripping plate member of the last is exposed whereby the last is easily removed from the first transfer station when a pair of gripping fingers of the robot grip thereabout.

According to the invention carrier means may be provided on the bottom side of the conveyor plate members, the conveyor co-operating with said carrier means in connection with the moving of the conveyor plate members towards or away from the first transfer station. In this manner a very advantageous structure is obtained.

Moreover according to the invention the two pairs of gripping fingers of the robot may be controlled in such a manner that when the moving arm is moving away from the first transfer station towards the second transfer station, the first pair of gripping fingers is "empty" and the second pair of gripping fingers "filled" with a last, whereas the control during the movement of the moving arm from the second transfer station towards the first transfer station is such that the first pair of gripping fingers is "filled" with a last and the second pair of gripping fingers is "empty". By adapting the gripping fingers so as to carry out the above moving pattern a very high efficiency of the robot is ensured as a last is always moving towards the opposite position either from the second transfer station or from the first transfer station.

According to the invention the conveyor may be adapted to circulate the conveyor plate members with the lasts whereby the lasts are only removed from and transferred to the conveyor plate members at the first transfer station. In this manner the system operates very efficiently because the operators handling the system have a good control of the lasts.

Furthermore according to the invention a row of stations such as a cooling station, a deburring station deburring the moulded soles, as well as a replacing station removing/placing the shoe legs from and on the lasts may be situated after the first transfer station when seen in the advancing direction of the conveyor. In this manner all the essential treatment steps are integrated in the system, and since the conveyor may be of an arbitrarily desired length sufficient room is present for the operators removing/placing the shoe legs from and on the lasts.

Finally according to the invention a fixing hole may be provided on the bottom side of the bottom part of the conveyor plate member, and a vertical fixing projection adjustable as to height may be present at the conveyor opposite the first transfer station, said fixing projection co-operating with the fixing hole in said bottom part whereby the positioning of the conveyor plate members on the first transfer station may optionally be carried out by means of microswitches.

BRIEF DESCRIPTION OF THE DRAWING

The invention will be described more detailed below with reference to the accompanying drawing, in which.

DESCRIPTION OF THE PREFERRED EMBODIMENTS

Figure 1:
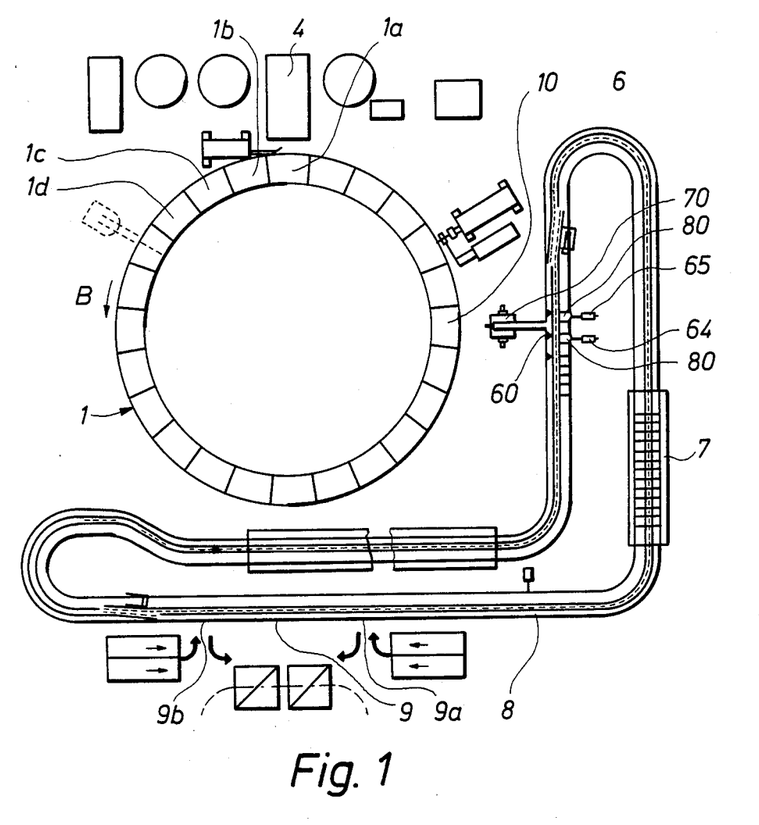
FIG. 1 is a diagrammatic top view of an embodiment of the system according to the invention.

The system shown in FIG. 1 for moulding soles onto shoe legs comprises a rotatable moulding table 1 with locations 1a, 1b, 1c, 1d for a plurality of lasts (not all the locations have been provided with reference numerals) and an endless conveyor 6 situated next to the moulding table. A second transfer station 10 is provided on the moulding table, and a first transfer station 60 is provided on the conveyor. A robot 70, cf. FIG. 3, is situated between these stations and transfers the lasts 40 provided with shoe legs or uppers (not shown) from the first transfer station to the second transfer station or vice versa.

Figure 7:
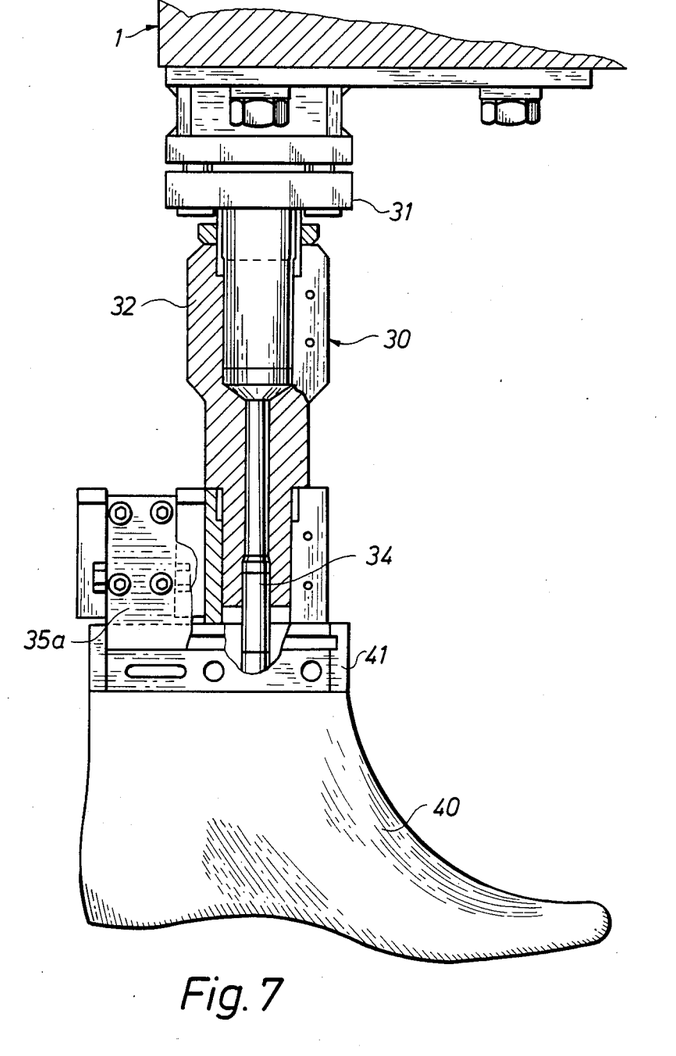
FIG. 7 is a side view, partly in section, of a last holder whereby the holding jaws of the last holder fix the gripping plate member of a last.
Figure 8:
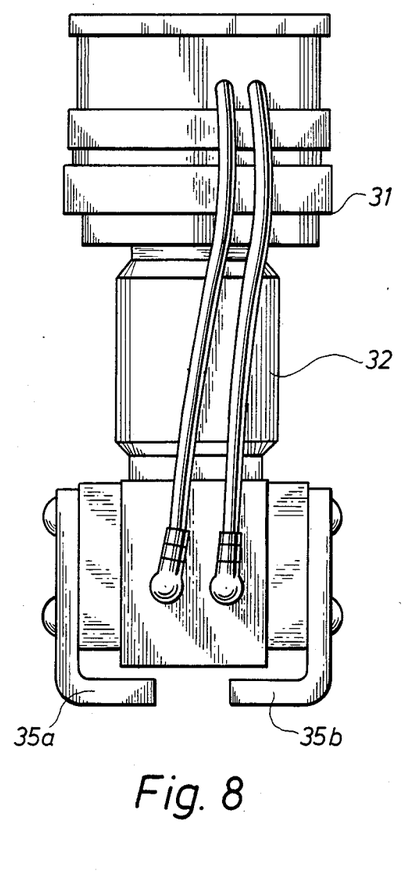
FIG. 8 is a rear view of the embodiment of FIG. 7.

A last holder 30, cf. FIG. 7, is mounted above the individual last locations 1a, 1b, 1c, 1d etc. as an integrating part of the moulding table. On the second transfer station 10 these last holders may receive and retain the individual lasts 40 so as later on to release the last 40 when the last holder has followed a 360° rotation of the moulding table. The conveyor is adapted to advance a plurality of conveyor plate members 80 carrying the individual lasts 40. Having reached the first transfer station each conveyor plate member releases a last by means of the robot, said robot carrying the last to the second transfer station 10. When each conveyor plate member 80 has been emptied it is ready to receive another last when said last reaches the conveyor plate member by means of the robot 70.

Figure 3:
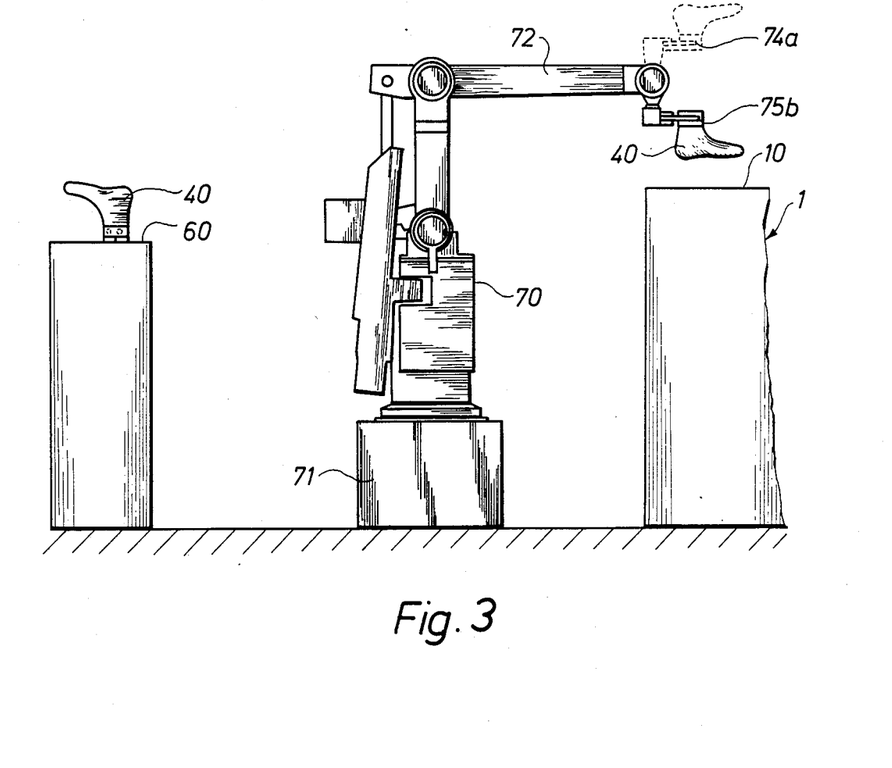
FIG. 3 is a side view of the embodiment of FIG. 2.

As illustrated in FIG. 3, each last 40 comprises at the top a gripping plate member 41 shaped in such a manner that in a very exact manner it can be gripped and retained by the robot. The gripping plate member 41 is furthermore shaped in such a manner that it is easy to fix on each conveyor plate member 80 or easy to fix on the last holder 30.

As soon as a last 40 has reached the second transfer station 10 on the moulding table 1 and has been secured to the last holder 30, it is advanced stepwise to a moulding station 4 where a sole is moulded onto the shoe leg situated on the shoe last by means of a mould not shown and situated about the lower portion of the shoe leg. The sole material may for instance be polyurethane foam. After the moulding of the sole at the station 4, the moulding table is gradually turned forwards in such a manner that the lasts reach the moulding station 4 one by one. The moulding table rotates in the direction indicated by the arrow B. When the table has turned 270° the last at 1a has reached the second transfer station 10. Subsequently, the robot 70 transfers the last to the first transfer station 60. As it appears the angle from the moulding station 4 to the second transfer station 10 can be made very great measured in the direction of the arrow B.

Figure 2:
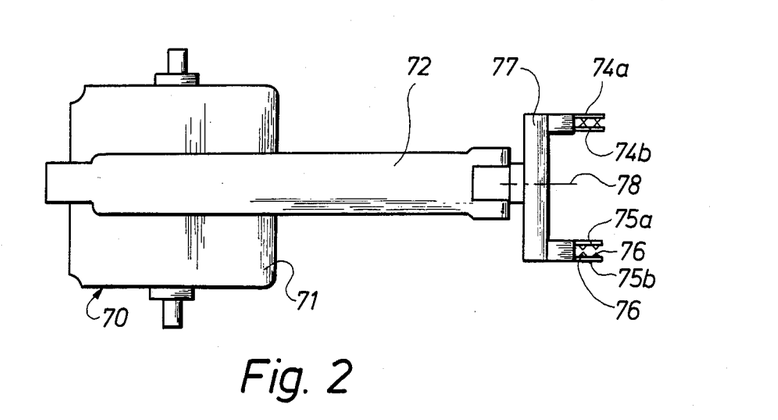
FIG. 2 is a top view of an embodiment of the robot according to the invention and provided with two pairs of gripping fingers.

As illustrated in FIGS. 2 and 3, the robot 70 comprises a housing 71, on which a moving arm 72 is mounted. This moving arm performs the transfer of the lasts 40 from the first transfer station to the second transfer station and vice versa. The moving arm 72 is provided with two pairs of gripping fingers 74a, 74b, and 75a, 75b. Each pair of gripping fingers can handle a last. The gripping fingers of each pair of gripping fingers can be mutually turned in a controlled manner, and on the side facing the second gripping finger each gripping finger can be provided with at least two gripping projections 76, only two being provided with reference numeral in FIG. 2. These gripping projections can co-operate with the gripping plate member 41 of each last 40.

Figure 4:
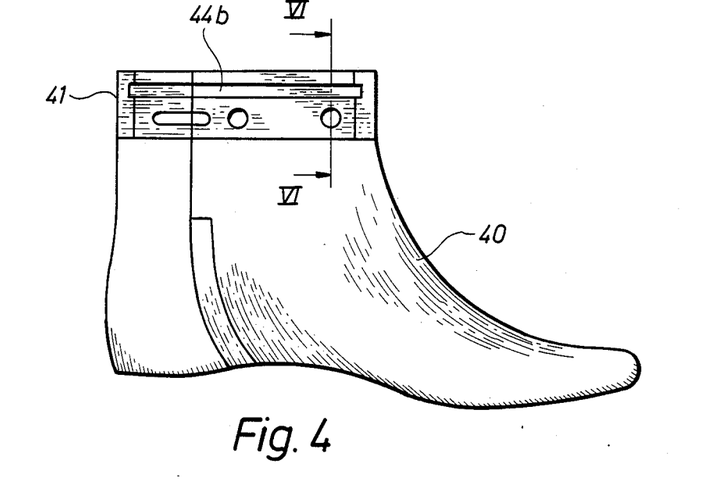
FIG. 4 is a side view of a last provided at its upper end with a gripping plate member.
Figure 5:
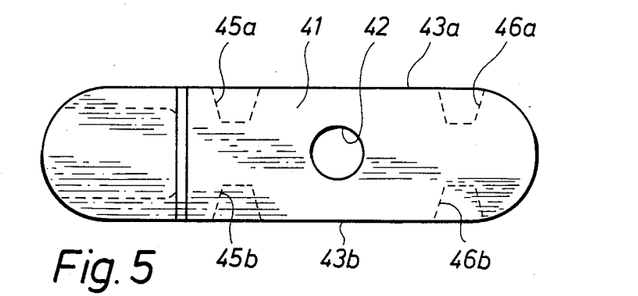
FIG. 5 is a top view of the gripping plate member of FIG. 4.

FIG. 7 illustrates how the last holder can be formed by an adjusting member 31, an intermediary member 32, as well as a pair of movable holding jaws 35a, 35b mounted below the intermediary member. The intermediary member 32 is optionally removed, and then the holding jaws 35a, 35b with the associated moving means may be mounted directly on the bottom side of the adjusting member 31. The moving means of the holding jaws 35a, 35b are preferably pneumatically operated by means of a magnetic valve. On the bottom side of the intermediary member, optionally on the bottom side of the adjusting member, a guiding pin 34 may be mounted which centers the gripping plate member 41 of the last 40 relative to the intermediary member or the adjusting member, respectively. The guiding pin 34 may co-operate with an upper centering hole 42 in the gripping plate member 41. As illustrated in FIGS. 4, 5, and 7 the gripping plate member 41 is elongated. On both opposing side surfaces 43a and 43b of the gripping plate member a groove 44a, 44b is present which cooperates with the holding jaws 35a, 35b of the last holder. The holding jaws 35a, 35b are preferably provided with ribs which in turn may co-operate with the grooves 44a and 44b.

Figure 6:
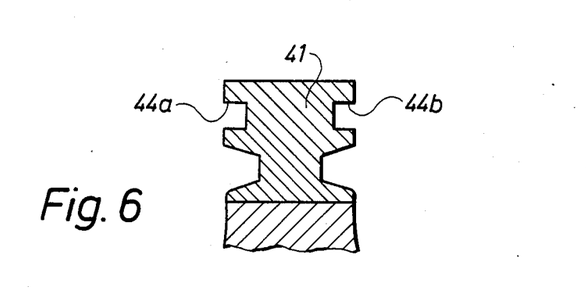
FIG. 6 is a sectional view taken along the line VI—VI of FIG. 4 of the embodiment of FIG. 4.

In order to ensure an efficient gripping by means of the gripping fingers 74a, 74b or 75a, 75b of the robot each side surface 43a, 43b of the gripping plate member 41 has been provided with at least two, preferably conical guiding holes 45a, 46a and 45b, 46b, cf. FIGs. 4, 5, and 6. The conicity of these holes is preferably slightly greater than the conicity of the gripping projections 76.

Figure 9:
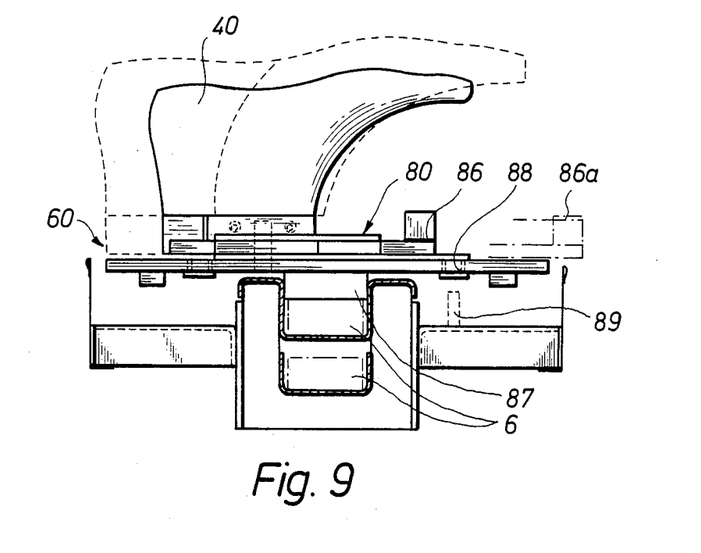
FIG. 9 is a vertical sectional view through the first transfer station of the system, the conveyor and a conveyor plate member situated thereon and carrying a last appearing clearly.
Figure 10:
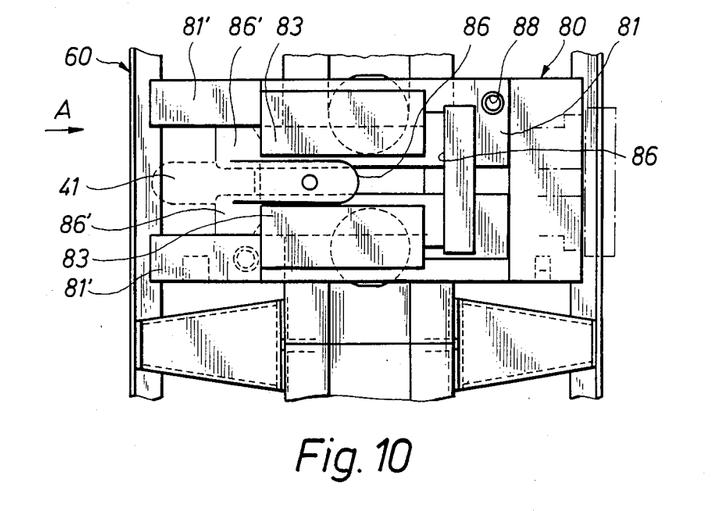
FIG. 10 illustrates part of the first transfer station of FIG. 9, whereby only a conveyor plate member, however, appears (each first transfer station has a capacity of two neighboring conveyor plate members)
Figure 11:
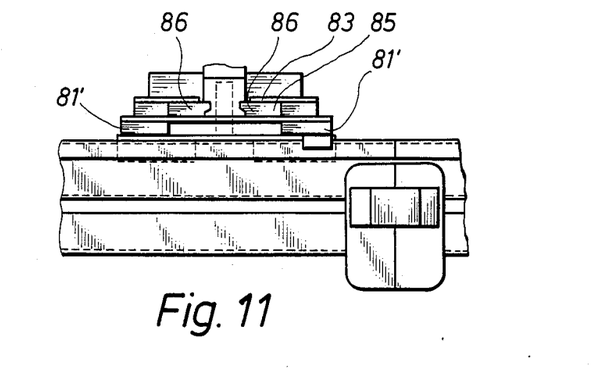
FIG. 11 illustrates the conveyor plate member of FIG. 10, seen in the direction of the arrow A of FIG. 10, but whereby part of the conveyor appears too.

FIG. 10 is a top view of a conveyor plate member 80, and FIG. 9 is a side view of said conveyor plate member. FIG. 11 is an end view of the conveyor plate member. The conveyor plate member comprises a substantially U-shaped bottom part 81. Guide rails 83 are mounted on the free webs 81' of the above U and are mutually spaced to form a slot 84. This slot is of a width slightly greater than the thickness of the gripping plate member 41 of each last 40. For the sake of clarity FIG. 10 illustrates a gripping plate member 41 by means of dotted lines. As illustrated a free guiding groove 85 is provided between each guide rail 83 and the free web 81' of the bottom part therebelow, said guiding groove receiving free locking webs 86' of a substantially U-shaped locking means 86. The latter is adapted to be reciprocated parallel to the bottom part 81 in such a manner that the locking webs 86' can engage the grooves 44a, 44b on each side of the gripping plate member 41, cf. FIGS. 4 and 6, so as to lock the latter onto the conveyor plate member 80 when the gripping plate member 41 of each last has been inserted in the slot 84 between the two guide rails 83 by means of the gripping fingers 74a, 74b or 75a, 75b of the robot 70.

Figure 12:
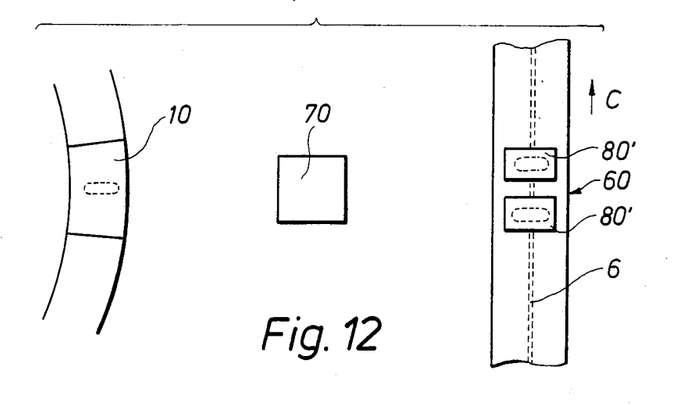
FIG. 12 is a diagrammatic view of the position of the robot between the second transfer station and the first transfer station.

As illustrated in FIG. 12 the first transfer station 60 may be adapted to handle two neighboring operation zones 80' and 80" simultaneously as conveyor plate members are provided in both zones and as the robot removes a last from one conveyor plate member such as for instance the member in the zone 80' and leaves the second conveyor plate member, i.e. the member 80" of the zone, idle. The transferred last is situated on a last holder on the second transfer station 10, but immediately before said last is situated another last having reached the station 10 on the moulding table is removed, the shoe leg of said second last having been provided with a sole. When the robot has been returned to the first transfer station 60, the latter last is situated on the conveyor plate member in the zone 80" in order to allow the latter to continue on the conveyor in the direction of the arrow C. The moving arm 72 of the robot can then grip another last on a conveyor plate member which has reached the zone 80'.

FIGS. 2 and 3 illustrate how the moving arm 72 of the robot may comprise a transverse part 77 at its outer end, said transverse part being rotatable about the longitudinal axis 78 of the moving arm. In this manner it is particularly easy for the moving arm to handle the lasts in such a manner that when the lasts are to be handled at the first transfer station 60, the soles of the lasts face always upwards, whereas said soles face downwards when the moving arm operates at the second transfer station 10. The turning of the lasts is carried out while the lasts are moved towards the opposite station and by the transverse part 77 being turned 180° about the axis 78.

The first transfer station 60 is provided with moving means 64, 65 which are preferably pneumatically or hydraulicly operated and which move the U-shaped locking means 86 forwards and backwards. The releasing position 86a of the locking means 86 has been illustrated by dotted lines in FIG. 9 the moving means 64 or 65 being omitted for the sake of clarity.

As illustrated at 87 of FIG. 9 carrier means may be provided on the bottom side of the conveyor plate members 80, said carrier means co-operating with the chain 6 of the conveyor when moving the conveyor plate members 80 towards or away from the first transfer station 60.

The two pairs of gripping fingers 74a, 74b and 75a, 75b of the robot are preferably controlled in such a manner that when the moving arm 72 moves from the first transfer station 60 to the second transfer station 10, the first pair of gripping fingers 74a, 74b is "empty" and the second pair of gripping fingers 75a, 75b "filled" with a last. However, when the moving arm is to return from the second transfer station 10 to the first transfer station 60, the control ensures that the first pair of gripping fingers is "filled" with a last from the station 10, the shoe leg of said last being provided with a sole, and that the second pair of gripping fingers 75a, 75b is "empty". In this manner the robot is always carrying a last irrespective of the fact whether said last is moving from the station 60 to the station 10 or vice versa. As a result, the robot is utilized very efficiently.

The moulding table 1 and the robot 70 comprise their respective program control unit not shown, whereas the control of the conveyor 6 can be integrated in a superior computer control.

As illustrated in FIG. 1, the conveyor 6 may be adapted to circulate the conveyor plate members 80 with the lasts 40 as these lasts are only removed from and transferred to the conveyor plate members 80 at the first transfer station 60. In this manner the lasts move in a closed circuit.

As further illustrated in FIG. 1, a row of stations such as a cooling station 7, a deburring station 8 deburring the moulded soles, as well as a replacing station 9, 9a, 9b removing the shoe legs provided with soles from the lasts and placing new shoe legs thereon may be provided after the first transfer station 60 in the advancing direction of the conveyor 6. These operations are carried out by the operators sitting next to the conveyor.

As illustrated in FIG. 10, a fixing hole 88 may be provided in the bottom part 81 of the conveyor plate member 80, whereas a vertical fixing projection 89 adjustable as to height may be provided at the conveyor opposite the first transfer station 60, said vertical fixing projection being indicated by dotted lines in FIG. 9 and co-operating with the fixing hole 88. In this manner each conveyor plate member may be fixed very accurately on the first transfer station. This fixing is important because the robot is programmed so as to operate with relatively narrow tolerances. The position of the conveyor plate members 80 on the first transfer station 60 may optionally be carried out by means of microswitches not shown.

The invention may be altered in many ways without thereby deviating from the scope thereof. Thus the robot may be replaced by two or more co-operating subrobots.

I claim:

1. In apparatus, for molding soles on shoe uppers, having at last one mold mounted for cooperation with a last, the improvement comprising a rotatable table with locations having last holders for receiving and holding a plurality of lasts, each last holder extending upwardly away form its location;

an endless conveyor situated near said table, said conveyor including conveyor plates having last holders on which lasts can be mounted and dismounted, said conveyor plates and said locations occupying substantially the same horizontal plane;

a robot including, transferring means, between said table and said conveyor for transferring lasts between said conveyor at a first transfer station and said table at second transfer station and vise versa, and shoe last rotating means for rotating said lasts 180° to reorient each last from the position it occupies on said conveyor to the position it occupies on said last holder;

holding means for causing each last holder to retain a last after it is are transferred to said table at said second transfer station and to release the last at said second transfer station after said table has revolved 360°;

each last, as oriented on said conveyor, including means for retaining one of said lasts in one of said plates by engaging said gripping plate member and said guiding means.

2. The apparatus of claim 1, wherein said last holder comprises an adjusting member; movable holding jaws mounted on the bottom side of the adjusting member; means for pneumatically controlling said holding jaws and including a magnetic valve; a guiding pin provided on the bottom side of said adjusting member said guiding pin centering the last member on each side of two opposing side surfaces comprises a groove receiving the two holding jaws and at least two, conical guiding holes automatically gripping the gripping plate member by means of gripping projections of the gripping fingers of the robot.

3. The apparatus of claim 1, further comprising moving means on the first transfer station, said moving means preferably being hydraulicly or pneumatically operated for the moving forwards and backwards of the U-shaped locking means.

4. The apparatus of claim 1, further comprising carrier means on the bottom side of said conveyor plate member said conveyor co-operating with said carrier means in connection with the moving of said conveyor plate members towards or away from said first transfer station.

5. The apparatus of claim 1, wherein said conveyor is adapted to circulate the conveyor plate members with the lasts whereby the lasts are only removed from and transferred to the conveyor plate members at the first transfer station.

6. The apparatus of claim 1, further comprising a row of stations including a cooling station, a deburring station for deburring the moulded soles, and a replacing station placing shoe uppers on the lasts, said row of stations situated after the first transfer station when seen in the advancing direction of said conveyor.

7. The apparatus of claim 1, wherein said last holder comprises an intermediary member; movable holding jaws mounted on the bottom side of said intermediary member; means for pneumatically controlling said holding jaws and including a magnetic valve; a guiding pin provided on the bottom side of said intermediary member, said guiding pin centering the last relative to the intermediary member, said gripping plate member on each side of two opposing side surfaces comprises a groove receiving the two holding jaws, and at least two conical guiding holes automatically gripping the gripping plate member by means of gripping projections of the gripping fingers of the robot.

8. The apparatus of claim 1, wherein said first transfer station comprises two adjacent conveyor plate members disposed such as to be seruable simultaneously.

9. The apparatus of claim 8, said robot being operable to remove a last from a first conveyor plate while the second conveyor plate remains idle.

10. The apparatus of claim 1, wherein each conveyor plate member comprises a substantially U-shaped bottom part and guide rails situated on the free legs of the U-shaped part, said guide rails being mutually spaced a distance slightly greater than the thickness of the gripping plate member of each last and forming a slot wherein a free guiding groove is present between each guide rail and the bottom part there below, said guiding groove receiving the individual free locking webs of a substantially U-shaped locking means, and means for reciprocating said locking means parallel to the bottom part in such a manner that the locking webs can engage the grooves on each side of the gripping plate member and lock the latter onto the conveyor plate member when the gripping plate member of each last has been inserted in the slot between the two guide rails by means of the gripping fingers of the robot.

11. The apparatus of claim 10, wherein a fixing hole is provided on the bottom side of the bottom part of the conveyor plate member, and a vertical fixing projection adjustable as to height is present at said conveyor opposite the first transfer station, said fixing projection co-operating with the fixing hold in said bottom part.

12. The apparatus of claim 1, wherein microswitches are disposed to carry out positioning of the conveyor plate at the first transfer station.

13. The apparatus of claim 1, wherein said transferring means comprises a moving arm provided with two pairs of gripping fingers each for handling a last during a transferring movement of the moving arm.

14. The apparatus of claim 13, wherein said gripping fingers of each pair of gripping fingers on the moving arm of the robot are mutually rotatable in a controlled manner, and at least one of said gripping finger of each pair is provided with at least two gripping projections co-operating with the gripping plate member of each last.

15. The apparatus of claim 14, wherein said moving arm of said robot at its outer end comprises a transverse part rotable about the longitudinal axis of the moving arm in order to allow the moving arm at the first transfer station to handle the lasts with the soles facing upwards and during the transferring movement to turn said lasts and at the second transfer station to handle the lasts with the soles facing downwards.

16. The apparatus of claim 14, wherein the two pairs of gripping fingers of the robot are controllable in such a manner that when the moving arm is moving away from the first transfer station towards the second transfer station, the first pair of gripping fingers are empty and the second pair of gripping fingers are filled with a last, whereas the control during the movement of the moving arm from the second transfer station towards the first transfer station is such that the first pair of gripping fingers are filled with a last and the second pair of gripping fingers are empty.

* * * * *

UNITED STATES PATENT AND TRADEMARK OFFICE
CERTIFICATE OF CORRECTION

PATENT NO. : 4,671,755

DATED : June 9, 1987

INVENTOR(S) : Jorgen Graae

It is certified that error appears in the above-identified patent and that said Letters Patent is hereby corrected as shown below:

On The Title Page Insert:

-- [73] Assignee: A/S Eccolet Sko
                  Bredebro, Denmark --.

Signed and Sealed this

Sixteenth Day of February, 1988

Attest:

DONALD J. QUIGG

*Attesting Officer*   *Commissioner of Patents and Trademarks*